(12) United States Patent
Yu et al.

(10) Patent No.: US 8,035,904 B2
(45) Date of Patent: Oct. 11, 2011

(54) CAMERA LENS MODULE

(75) Inventors: Hyun-Ho Yu, Seoul (KR); Doo-Sik Shin, Suwon-si (KR); Byung-Cheol Lee, Chungcheongbuk-do (KR); Jong-Pil Lee, Cheongju-si (KR); Jin-Soo Seol, Cheongju-si (KR)

(73) Assignee: Samsung Electronics Co., Ltd., Maetan-Dong, Yeongtong-gu, Suwon-si, Gyeonggi-do (KR)

( * ) Notice: Subject to any disclaimer, the term of this patent is extended or adjusted under 35 U.S.C. 154(b) by 88 days.

(21) Appl. No.: 12/203,967

(22) Filed: Sep. 4, 2008

(65) Prior Publication Data

US 2009/0067068 A1    Mar. 12, 2009

(30) Foreign Application Priority Data

Sep. 7, 2007  (KR) .................. 10-2007-0091114
Jun. 27, 2008  (KR) .................. 10-2008-0061631

(51) Int. Cl.
G02B 7/02    (2006.01)

(52) U.S. Cl. ...................................... 359/823; 359/819

(58) Field of Classification Search .................... 359/823
See application file for complete search history.

(56) References Cited

U.S. PATENT DOCUMENTS

| 7,262,927 | B1 | 8/2007 | Shyu et al. ............... 359/823 |
| 7,405,892 | B2 * | 7/2008 | Wu et al. .................. 359/824 |
| 2006/0146298 | A1 * | 7/2006 | Lin ........................... 353/101 |
| 2007/0223110 | A1 * | 9/2007 | Ge et al. ..................... 359/699 |
| 2009/0167926 | A1 * | 7/2009 | Westerweck et al. ..... 348/345 |

FOREIGN PATENT DOCUMENTS

CN    1869757    11/2006

* cited by examiner

Primary Examiner — Ricky L Mack
Assistant Examiner — James C Jones
(74) Attorney, Agent, or Firm — Cha & Reiter, LLC

(57) ABSTRACT

A camera lens module is provided, in which a lens housing has at least one lens, a main frame contains the lens housing along an optical axis, a support portion is engaged with the lens housing and with the main frame to be rotatable along the optical axis, a cover is engaged with the main frame, for keeping the lens housing contained in the main frame, and a control member is engaged with the cover, for moving the support portion along the optical axis.

17 Claims, 10 Drawing Sheets

CAMERA LENS MODULE

CLAIM OF PRIORITY

This application claims the benefit of the earlier filing date, under 35 U.S.C. §119(a) to those patent applications filed in the Korean Intellectual Property Office on Sep. 7, 2007 and assigned Serial No. 2007-91114 and filed in the Korean Intellectual Property Office on Jun. 27, 2008 and assigned Serial No. 2008-61631, the entire disclosure of both of which are hereby incorporated by reference.

BACKGROUND OF THE INVENTION

1. Field of the Invention

The present invention generally relates to a camera lens module and more particularly, a camera lens module for controlling a focal length by moving a lens housing along an optical axis.

2. Description of the Related Art

A digital camera is a device for electrically performing signal processing including recoding, processing, and reproduction by converting an image signal to an electrical signal. Compared to a silver halide film-type camera, the digital camera enables a user to view a captured image immediately without the need for development or chemical processing. Also, since recorded image information exists in an electronic form, the digital camera allows computer-aided post-processing and remote transmission of an image. This explains the popularity of the digital camera as one of image apparatuses for the multimedia era.

Recently, the digital camera has found its use in a portable terminal by mounting a camera lens module in the portable terminal. As portable terminals are equipped with camera lens modules that perform almost as well as the standard digital camera itself users generally see no distinction between the digital camera and the portable terminal with a camera lens module.

However, to be included within a portable terminal, the camera lens module must become smaller. Thus, a challenging issue for the camera lens module is that it should perform well despite its small size. Resolving power as well as magnification is critical to the performance of the camera lens module. With an improved resolving power, an image of an object is rendered in such clarity that minute details of the image can be observed. The camera lens module can select a focal length by controlling the distance between an image sensor and a lens and the optimal focal length offers the maximum resolving power that the camera lens module can exert.

FIG. 1 is an exploded perspective view of a conventional camera lens module 200.

Referring to FIG. 1, the camera lens module 200 includes a lens housing 201 and a main frame 202. The lens housing 201, which is configured as to be combined with the main frame 202, includes a lens (not shown) and an infrared filter (not shown) therein. The lens housing 201 is also provided, on an outer surface, with a first engagement portion 211 having screw threads. The main frame 202 has an image sensor (not shown) mounted therein and is provided with an engagement hole 221 for containing the lens housing 201 therein. The engagement hole 221 has a second engagement portion 223 with screw threads on an inner surface thereof, for combining with the first engagement portion 211. When the lens housing 201 is mounted in the main frame 202, the second engagement portion 223 is screw-engaged with the first engagement portion 211. At the same time, the lens and the infrared filter are aligned with the image sensor along an optical axis. With the first and second engagement portions 211 and 233 in screw engagement, the lens housing 201 can move along the optical axis, rotating in the engagement hole 221, thereby adjusting the distance to the image sensor. Thus, the camera lens module 200 sets a distance between the lens and the image sensor according to a back focal length specific to the lens mounted in the lens housing 201. Setting the distance between the lens and the image sensor according to the back focal length of the lens will be referred to as control of an initial focal length.

With the initial focal length set, the camera lens module 100 controls the distance between the lens and the image sensor according to the distance between an object and the lens by use of an actuator (not shown), when the object is actually captured.

In the process of controlling the initial focal length, the screw threads formed in the lens housing and the main frame increase the size of the camera lens module by as much as their height and, thus, impeding miniaturization of the camera lens module. Moreover, foreign materials are produced due to friction involved in the screw engagement between the lens housing and the main frame. The foreign materials may fall onto the infrared filter or the image sensor and taking the form of an image in a captured image. As a consequence, the quality of the captured image and the reliability of the camera lens module are decreased.

SUMMARY OF THE INVENTION

Accordingly, an aspect of exemplary embodiments of the present invention is to provide a camera lens module for facilitating movement of a lens housing to set an initial focal length.

Another aspect of exemplary embodiments of the present invention provides a camera lens module for increasing the quality of a captured image and the reliability of the camera lens module by reducing foreign materials produced during controlling an initial focal length.

A further aspect of exemplary embodiments of the present invention provides a small-size camera lens module.

In accordance with an aspect of exemplary embodiments of the present invention, there is provided a camera lens module, in which a lens housing has at least one lens, a main frame contains the lens housing along an optical axis, a support portion engaging the lens housing and in engagement with the main frame so as to be rotatable along the optical axis, a cover is engaged with the main frame, for keeping the lens housing contained in the main frame, and a control member is engaged with the cover, for moving the support portion along the optical axis.

The camera lens module further includes an elastic member installed on the main frame for providing an elastic force to move the support portion toward the cover.

The support portion has one end supported by the control member and the other end supported by the elastic member, and thus is kept stationary at a predetermined position in the main frame.

The elastic member is formed of urethane foam of polyurethane (poron) or the elastic member is a plate spring. Note that poron is the urethane foam jointly developed by Rogers and Inoac, which has been being used commonly as a cushion member or an elastic member.

The camera lens module further includes assembly protrusions protruding from an inner surface of the main frame to face each other and assembly grooves formed on both side surfaces of the support portion, in correspondence with the assembly protrusions. The assembly protrusions combine the main frame with the support portion and guide movement of the support portion by being inserted into the assembly grooves.

The cover includes an opening formed along the optical axis in a state when the cover is engaged with the main frame, and a through hole formed near the opening, facing the support portion.

The control member supports the support portion, while the control member is engaged with the cover and, extending through the through hole.

The control member is screw-engaged with the through hole and makes a linear movement together with the support portion along the optical axis over the main frame, simultaneously with rotating on the cover.

The control member rotatably extends through the through hole and is screw-engaged with the support portion The control member moves the support portion linearly along the optical axis over the main frame by rotating on the cover.

The camera lens module further includes an image sensor installed on the main frame, facing the lens housing, and the control member controls a distance between the lens housing and the image sensor by moving the support portion together with the lens housing along the optical axis.

The camera lens module further includes an actuator included in the support portion, for receiving power from the main frame, and a magnetic body engaged with the lens housing, for generating a driving force through interaction with the actuator. The lens housing moves along the optical axis by receiving the driving force generated through interaction between the actuator and the magnetic body, thereby controlling a focal length when an object is captured.

In one aspect of the invention, the actuator is an electromagnet and the magnetic body is a permanent magnet.

The camera lens module further includes first support members formed in one of the lens housing and the support portion, a guide rod having one end fixed to a first support member and the other end fixed to another first support member, and second support members formed in the other of the lens housing and the support portion. The guide rod is extended through the second support members to be movable along an optical axis.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

The matters defined in the description, such as a detailed construction and elements, are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
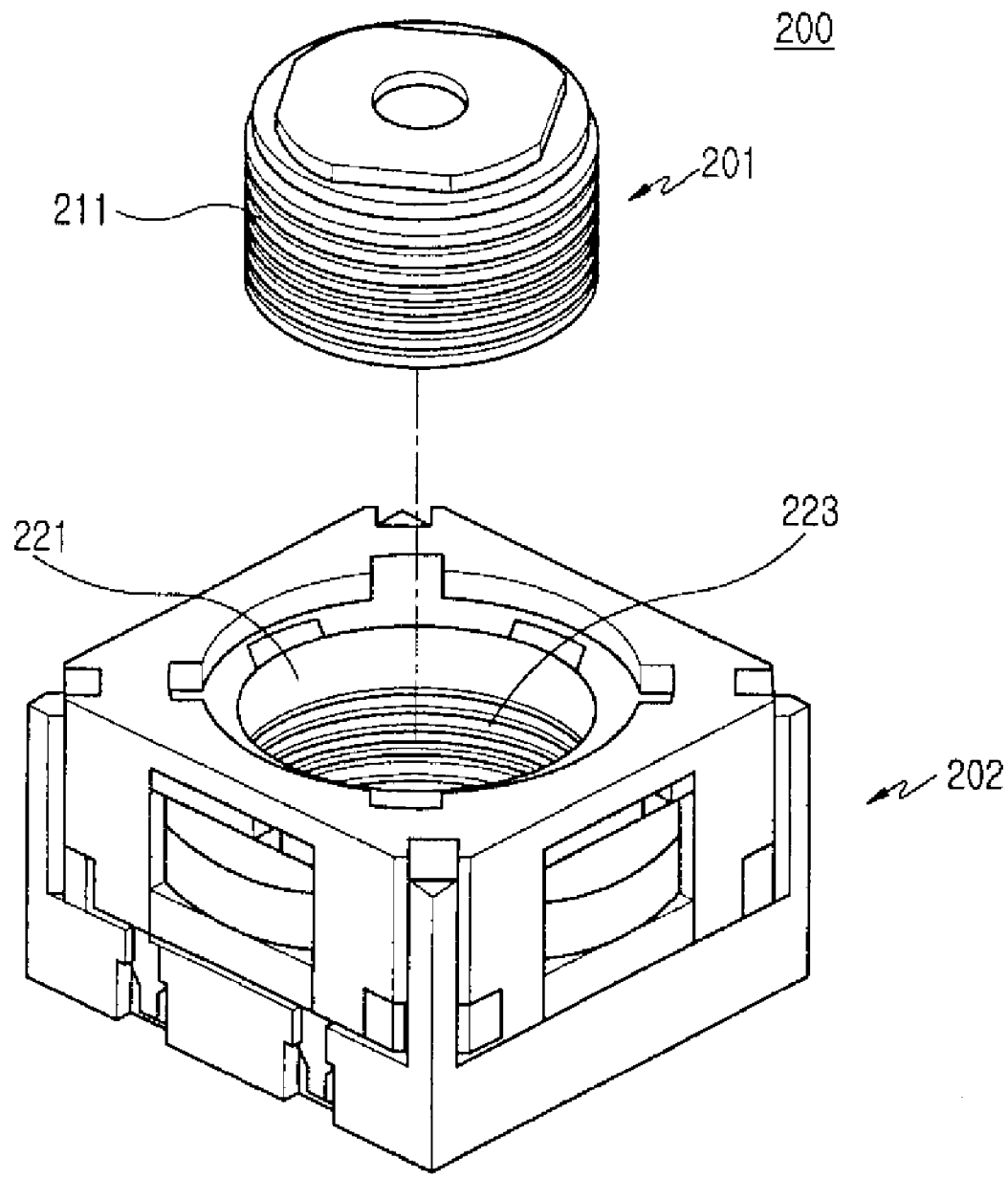
FIG. 1 is an exploded perspective view of a conventional camera lens module.
Figure 2:
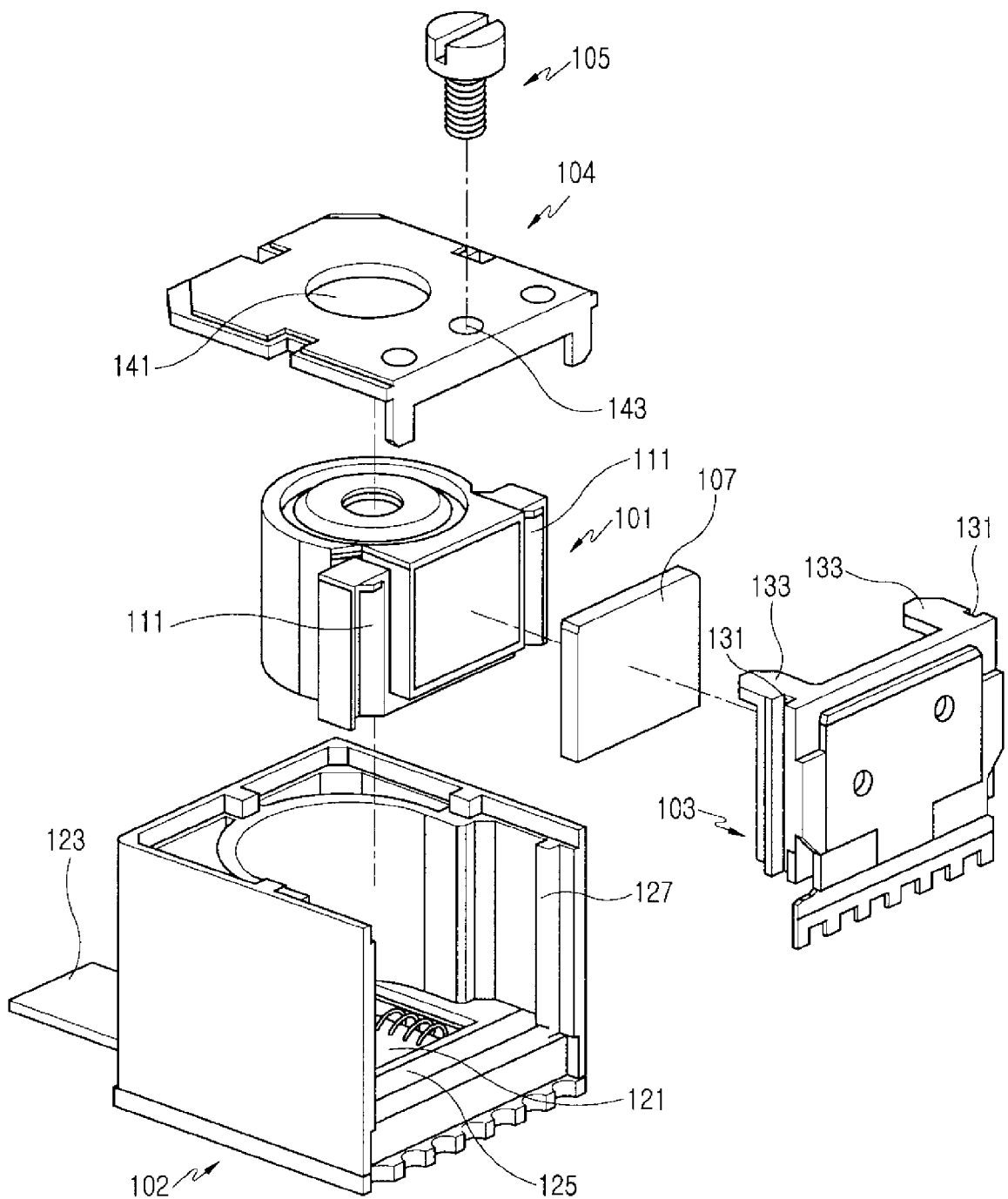
FIG. 2 is an exploded perspective view of a camera lens module according to an exemplary embodiment of the present invention.
Figure 3:
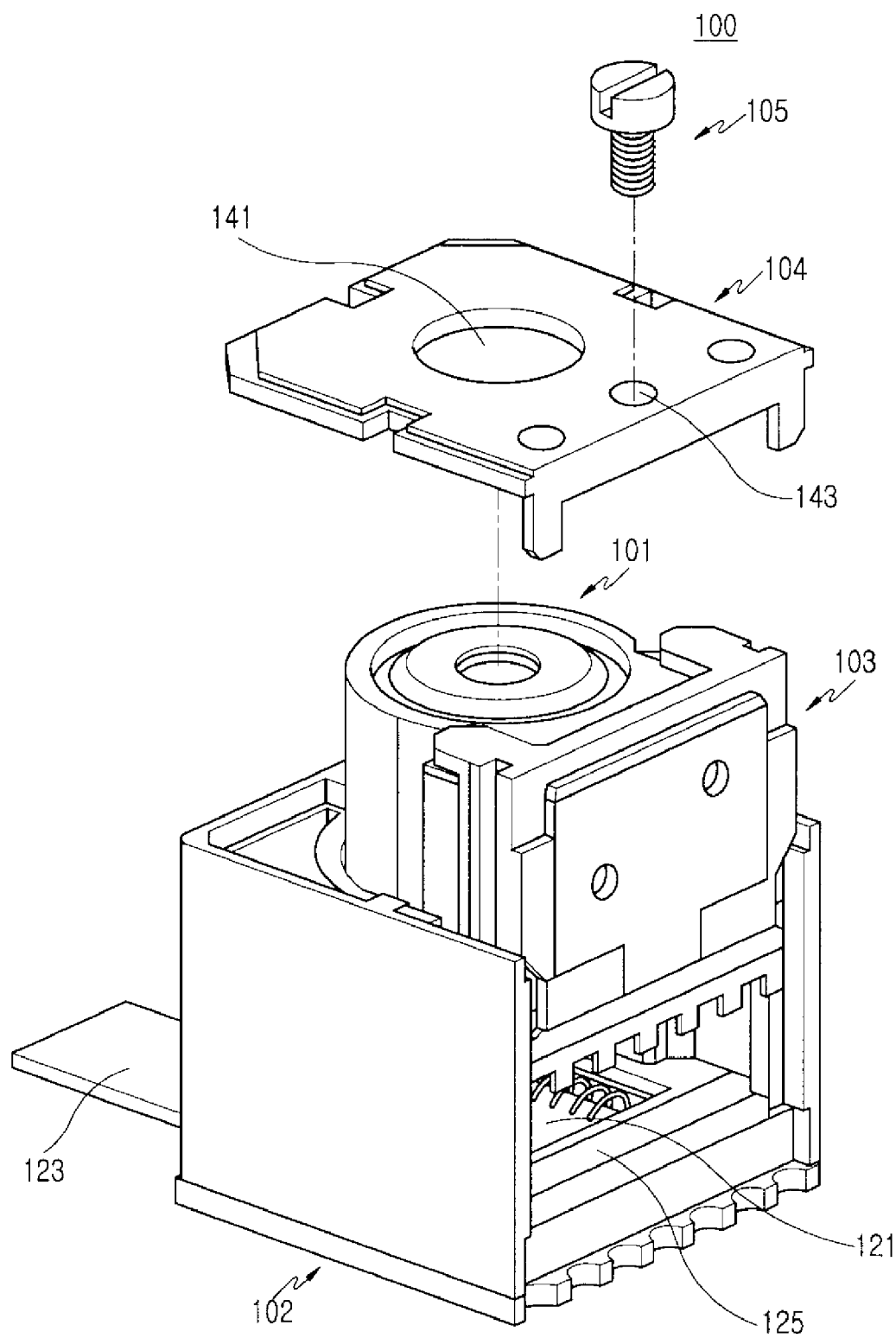
FIG. 3 is a perspective view of the camera lens module illustrated in FIG. 2 in a partially assembled state.
Figure 4:
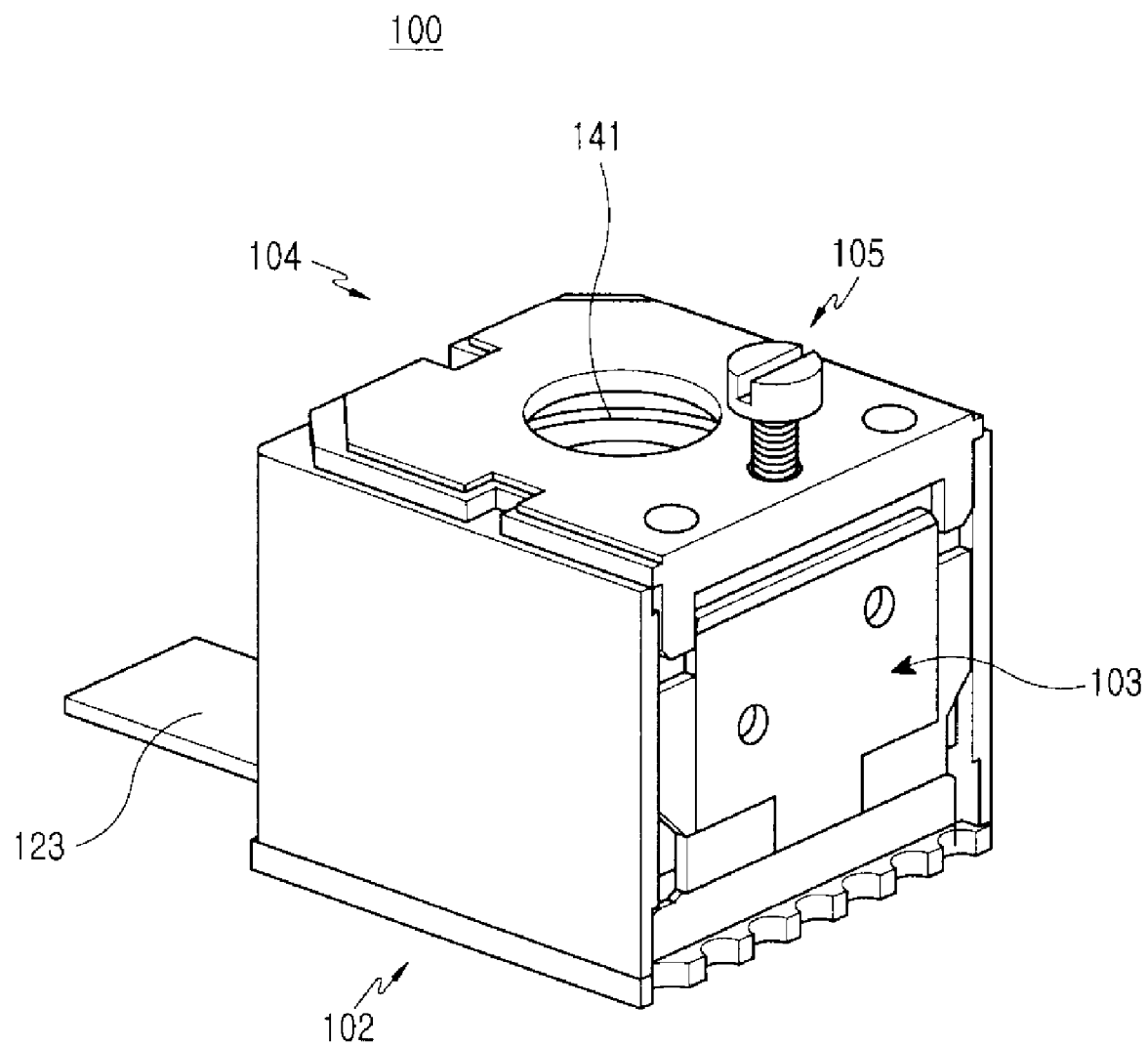
FIG. 4 is a perspective view of the camera lens module illustrated in FIG. 2 in a fully assembled state.
Figure 5:
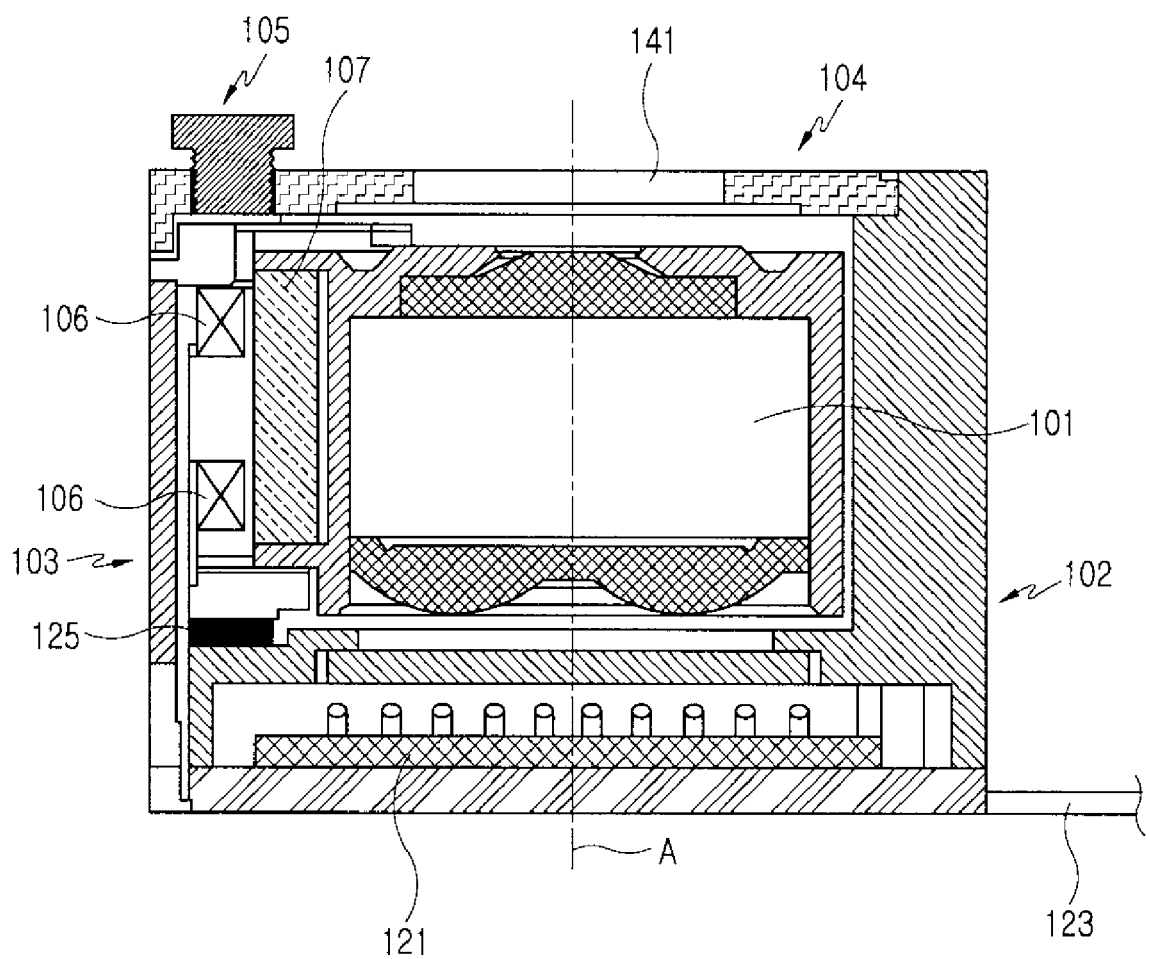
FIG. 5 is a sectional view of the camera lens module illustrated in FIG. 4.

FIG. 2 is an exploded perspective view of a camera lens module 100 according to an exemplary embodiment of the present invention, FIG. 3 is a perspective view of the camera lens module 100 illustrated in FIG. 2 shown in a partially assembled state, FIG. 4 is a perspective view of the camera lens module 100 illustrated in FIG. 2 shown in a fully assembled state, and FIG. 5 is a sectional view of the camera lens module 100 illustrated in FIG. 4.

Referring to FIGS. 2 to 5, the camera lens module 100 according to the exemplary embodiment of the present invention includes a lens housing 101, a main frame 102, a support portion 103, a cover 104, and a control member 105. The lens housing 101 is provided with at least one lens (not shown). The main frame 102 contains the lens housing 101 along an optical axis. The main frame 102 is provided with an image sensor 121, a circuit board 123, and an elastic member 125.

The image sensor 121, which faces the lens housing 101 contained in the main frame 102, detects an image of an object incident through the lens housing 101, (i.e., the lens, therein) and converts the image to an electrical signal.

The image sensor 121 is mounted on the circuit board 123 and transfers the signal received from the image sensor 121 to other components.

The elastic member 125 may be formed of poron or the elastic member may be a plate spring, installed in the main frame 102. The elastic member provides an elastic force to move the support portion 103 toward the cover 104.

The main frame 102 includes, on an inner surface thereof, assembly protrusions 127 facing each other. The assembly protrusions 127 are extended along the optical axis.

The support portion 103 is combined with the main frame 102 and retains the lens housing 101 contained within the main frame 102. Assembly grooves 131 are formed on both side surfaces of the support portion 103, in correspondence with the assembly protrusions 127. To be more specific, the assembly grooves 131 are recessed into both side surfaces of the support portion 103, for allowing the assembly protrusions 127 to be inserted therein. Thus, the assembly protrusions 127 are inserted into the assembly grooves 131, so that they can move along the optical axis in the assembly grooves 131. As a result, the support portion 103 is, in combination with the main frame 102, movably along the optical axis with the guidance of the assembly protrusions 127. That is, as the assembly protrusions 127 are inserted into the assembly grooves 131, it combines the main frame 102 with the support portion 103 and guides the movement of the support portion 103. As the lens housing 101 is combined with the support portion 103, it moves together with the support portion 103 along the optical axis in the main frame 102.

The cover 104 retains the lens housing 101 in the main frame 102, by engaging the main frame 102. Therefore, the image sensor 121, the lens housing 102, and the cover 104 are aligned sequentially along the optical axis. Also, the cover 104 has an opening 141 and a through hole 143, formed thereon. The opening 141 is formed along the optical axis in the state where the cover 104 is combined with the main frame 102 and provides a path in which an image of the object is incident. The image of the object is formed on the image sensor 121 via the opening 141 and the lens housing 101. The through hole 143 is formed near the opening 141, facing the support portion 103. The through hole 143 is also provided with screw threads on an inner surface. The control member 105 has screw threads on an outer surface and is combined with the cover 104, extending through the through hole 143. As screw threads are formed on the inner surface of the through hole 143 and on the outer surface of the control member 105, the control member 105 is screw-engaged with the through hole 143, thereby supporting the support portion 103 while being engaged with the cover 104. Here, the support portion 103 is kept stationary at a predetermined position of the main frame 102 since one end is supported by the control member 105 and the other end is supported by the elastic member 125.

The control member 105 makes a linear movement simultaneously with the support portion 103 along the optical axis over the main frame 102, in accordance with rotation a predetermined direction. When the support member 103 moves to the elastic member 125, the elastic member 125 accumulates an elastic force to move the support member 103 toward the cover 104. Along with the movement of the support portion 103 to the elastic member 125, the lens housing 101 also approaches the image sensor 121.

With the elastic force for moving the support portion 103 toward the cover 104 accumulated in the elastic member 125, when the control member 105 rotates in the other direction, for example, counter-clockwise on the cover 104, the support portion 103 moves toward the cover 104 by the elastic force of the elastic member 125. Thus, the lens housing 101 recedes from the image sensor 121. That is, the lens housing 101 approaches or recedes from the image sensor 121 along the optical axis together with the support portion 103 according to the rotation direction of the control member 105.

While the control member 105 moves the support portion 103 toward the elastic member 125 by clockwise rotation on the cover 104 in the exemplary embodiment of the present invention, the same effect can be achieved by counter-clockwise rotation of the control member 105. It is clearly understood to those skilled in the art that when the control member 105 moves the support portion 103 toward the elastic member 125 by counter-clockwise rotation on the cover 104, its clockwise rotation moves the support portion 103 toward the cover 104.

It can be concluded that the lens housing 101 adjusts the distance to the image sensor 121 as the control member 105 makes a linear movement together with the support portion 103, simultaneously with rotating on the cover 104. In the state where the control member 105 is combined with the cover 104, the lens housing 101 is kept still in the main frame 102 by the control member 105 and the elastic member 125 along with the support portion 103. That is, the control member 105 is used to control the initial focal length of the camera lens module 100. As stated before, control of the initial focal length by the control member 105 amounts to control of the distance between the lens mounted in the lens housing 101 and the image sensor 121. If light is incident along the optical axis, the distance between the lens housing 101 and the image sensor 121 is set according to a focal length specific to the lens, which is done by the control member 105. That is, the control member 105 positions and keeps the lens housing 101 at the initial focal length over the elastic member 125 and the main frame 102.

Meanwhile, when a user actually takes a picture, a position at which an image of the object is formed does not match to the initial focal length, it is necessary to adjust the distance between the lens and the image sensor 121 according to the distance between the lens and the object. For this purpose, the camera lens module 100 is further provided with an actuator 106 and a magnetic body 107. Control of the focal length in actual photographing will be referred to as control of an actual focal length.

The actuator 106 is an electromagnet, included in the support portion 103 and receives power from the main frame 102. The image sensor 121 senses an image of the object through the lens housing 101. According to the distance between the object and the camera lens module 100, the lens housing 101 is moved along the optical axis, manually or automatically.

In the manual scheme, the user manipulates the lens housing 101 to adjust the magnification of the lens, when needed. For the automatic operation, the camera lens module 100 may be further provided with a distance sensor for sensing the distance between the object and the lens and a driving motor for adjusting the magnification of the lens according to the sensed distance. Typically, a small-size camera lens module controls the actual focal distance automatically.

For the automatic actual focal length control, the actuator 106 receives power from the main frame 102 and generates an electric field according to a signal corresponding to the distance between the object and the lens, sensed by the distance sensor. The magnetic body 107 is a permanent magnet and is positioned facing the actuator 106, and is engaged with the lens housing 101. A driving force to move the magnetic body 107 against the actuator 106 is generated by interaction between the electric field of the magnetic body 107 and an electric field produced by the actuator 106. That is, the actuator 106 produces an electric field corresponding to the received power and the interaction between the electric field of the actuator 106 and the electric field of the magnetic body 107 generates a driving force. As the magnetic body 107 is combined with the lens housing 101, the driving force moves the lens housing 101 along the optical axis. The driving force generated according to the distance between the object and the lens leads to the movement of the lens housing 101 along the optical axis. The resulting adjustment of the distance between the lens and the image sensor 121 achieves a focal length suitable for photographing an object by the camera lens module 100.

In order to guide the movement of the lens housing 101 with respect to the support portion 103 during this actual focal length control operation, the lens housing 101 is provided with guide grooves 111 and the support portion 103 has guide protrusions 133. The lens housing 101 can be so shaped that it can make a linear movement in the main frame 102. The addition of the guide grooves 111 and the guide protrusions 133 provide for a linear movement of the lens housing 101 that is more stable. 'The lens housing 101 can be so shaped that it can make a linear movement' means that the lens housing 101 is shaped such that its surface perpendicular to an optical axis direction is constant at any position and the main frame 102 is also shaped in accordance with the lens housing 101, thus guiding the linear movement of the lens housing 101.

Figure 6:
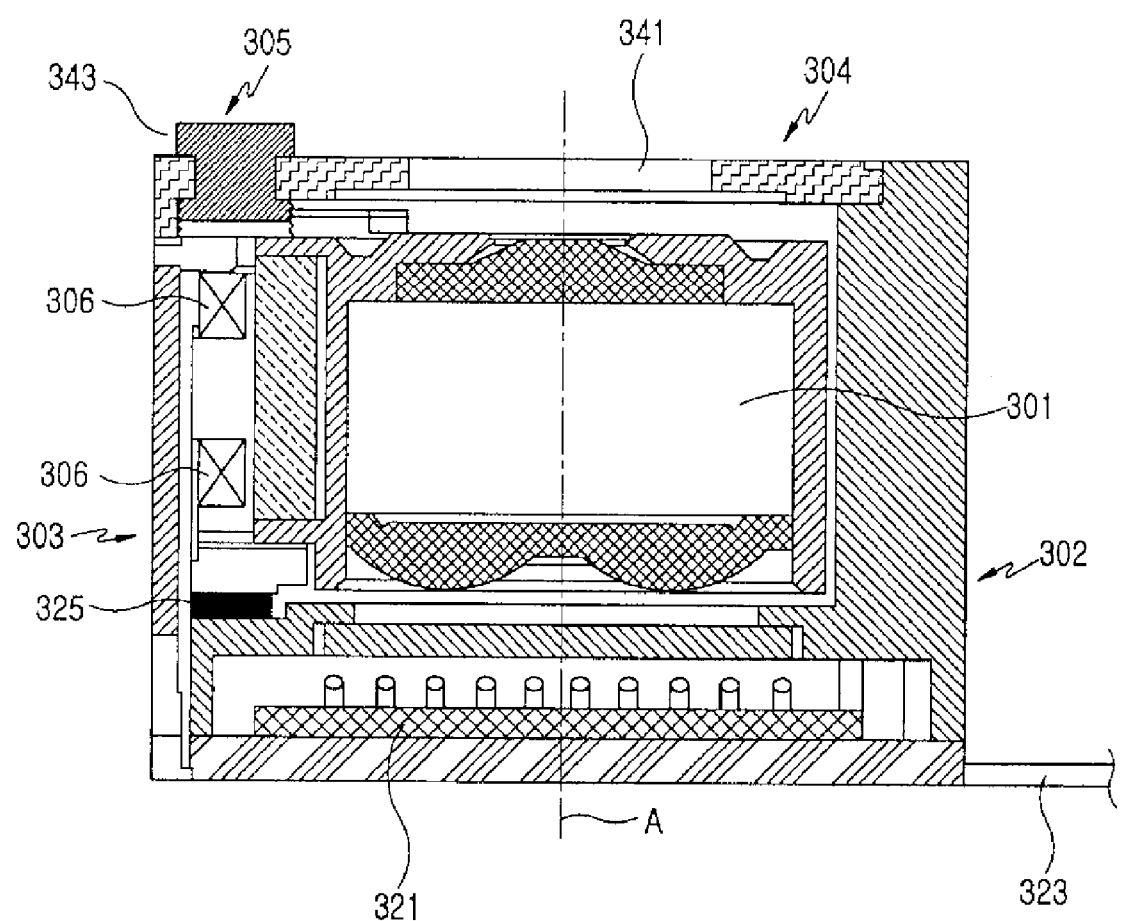
FIG. 6 is a sectional view of an assembled camera lens module according to another exemplary embodiment of the present invention.

FIG. 6 is a sectional view of an assembled camera lens module 300 according to another exemplary embodiment of the present invention. The camera lens module 300 is identical in configuration to the camera lens module 100 of the first exemplary embodiment of the present invention, except the shape of a control member combined with the cover, a support mechanism of the support portion for the control member, and the direction of a linear movement of the support portion caused by rotation of the control member.

In the camera lens module 100 according to the first exemplary embodiment of the present invention, the control member 105 is combined with the cover 104, extending through the through hole 143, and supports the support portion 103. As the control member 105 is screw-engaged with the through hole 143, it is rotatable on the cover 104, and the support portion 103 is kept still in the main frame 102, supported by the control member 105 and the elastic member 125. The control member 105 makes a linear movement together with the support portion 103 along the optical axis over the main frame 102 by rotation of cover 104. Simultaneously, the elastic member 125 is distorted in a direction corresponding to the direction of the linear movement of the control member 105.

In the camera lens module 300 according to the second exemplary embodiment of the present invention, a control member 305 is rotatably extended through a through hole 343 and screw-engaged with a support portion 303. The control member 305 is confined to rotation on a cover 304 without making a linear movement along the optical axis. When the control member 305 rotates, only the support portion 303 makes a linear movement along the optical axis over a main frame 302. The linear movement is made by an elastic force from an elastic member 325 in a state where the support portion 303 is supported by the elastic member 325. Because the support portion 303 can move linearly in screw-engagement with the control member 305, the elastic member 325 need not be provided.

Figure 7:
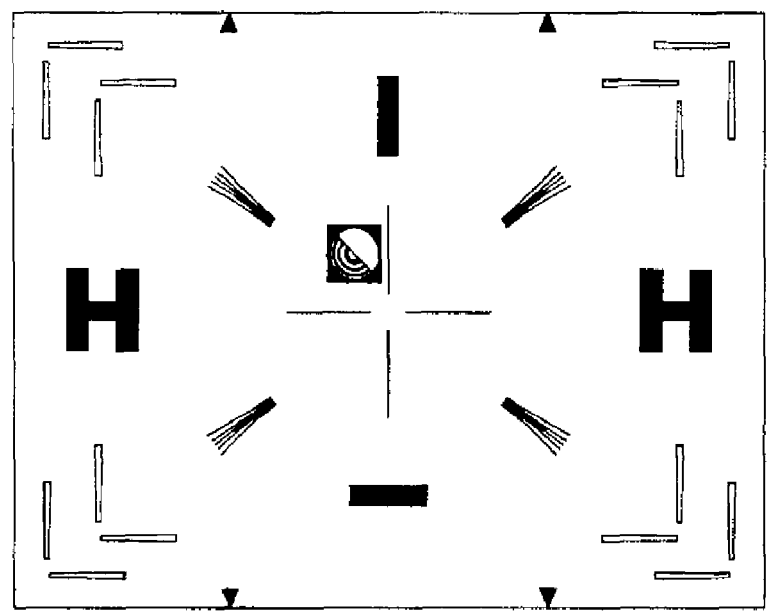
FIG. 7 illustrates a resolution chart image of the conventional camera lens module.
Figure 8:
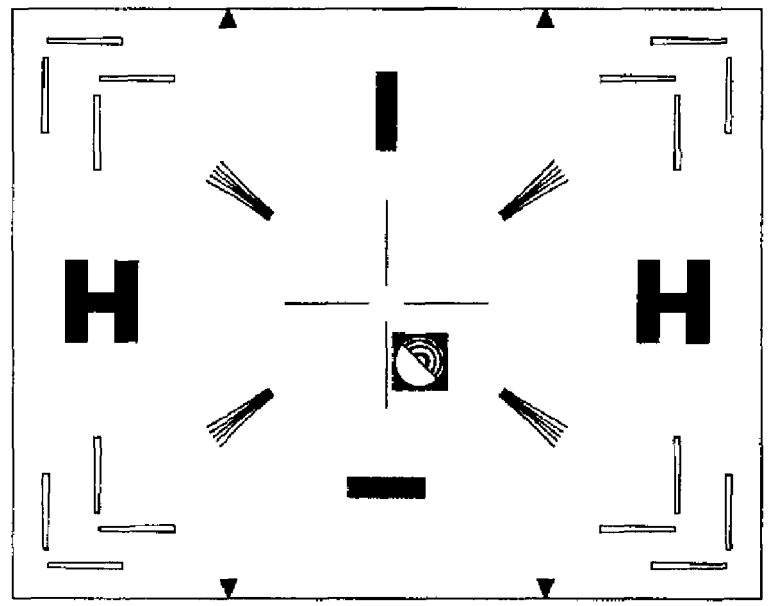
FIG. 8 illustrates a resolution chart image of a camera lens module according to an exemplary embodiment of the present invention.

FIG. 7 illustrates a resolution image chart of the conventional camera lens module, and FIG. 8 illustrates a resolution image chart of a camera lens module according to an exemplary embodiment of the present invention. FIGS. 7 and 8 present a comparison between the camera lens modules in terms of resolving power.

The resolving power of a lens is the distance between two points of an object that the lens recognizes. In other words, the resolving power represents the level of detail that the lens can ascertain. The resolution chart images of FIGS. 7 and 8 reveal that the camera lens module of the present invention has a visually similar resolving power as that of the conventional camera lens module. This means that the camera lens module of the present invention provides a user with a sufficient resolving power. That is, the camera lens module of the present invention can set an initial focal length by adjusting the distance between an image sensor and a lens housing with almost the same resolving power as that of the conventional camera lens module. Further, it is easier and less costly to make according to the teachings of the present invention.

Figure 9:
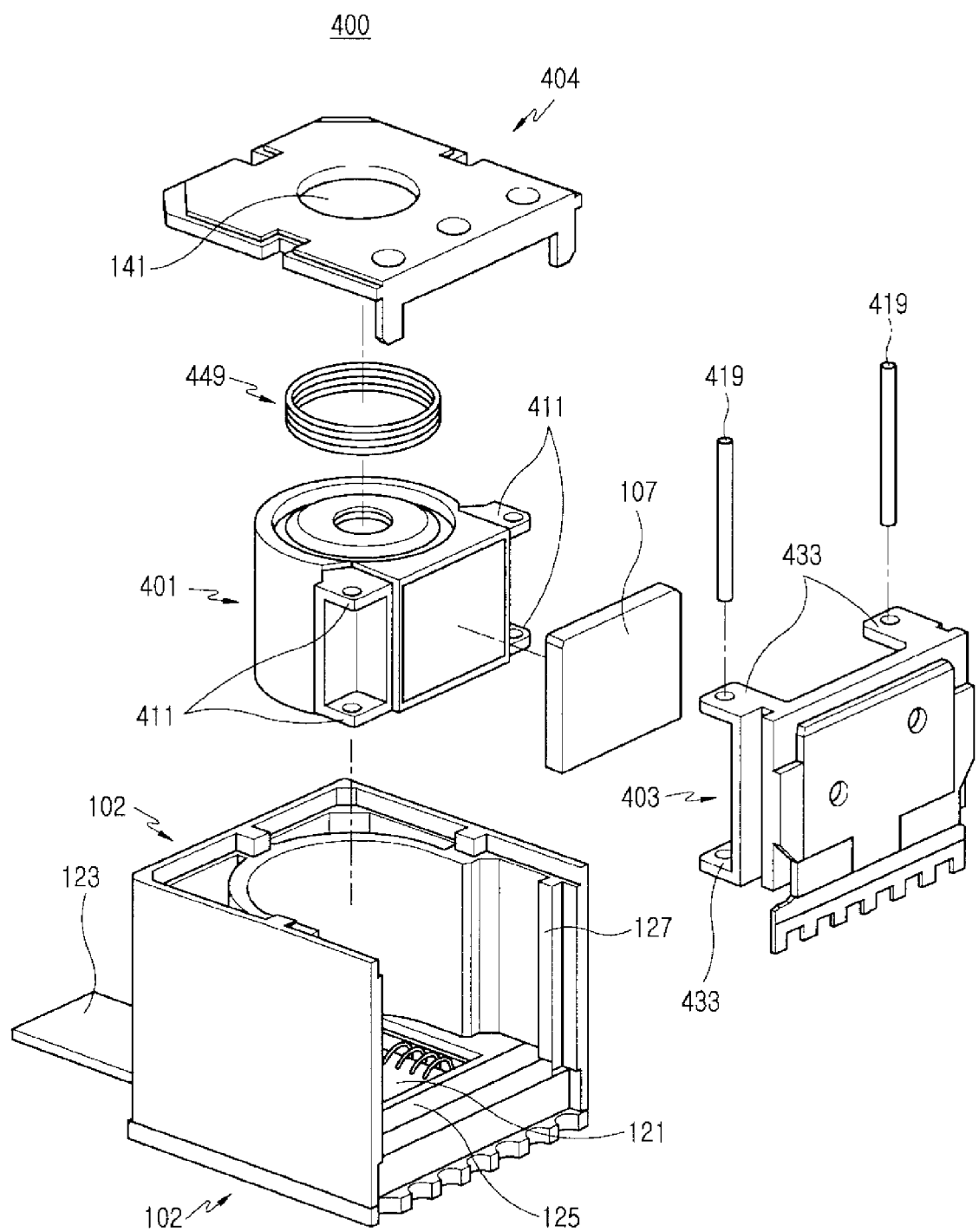
FIG. 9 is a perspective view of a camera lens module according to a third exemplary embodiment of the present invention.
Figure 10:
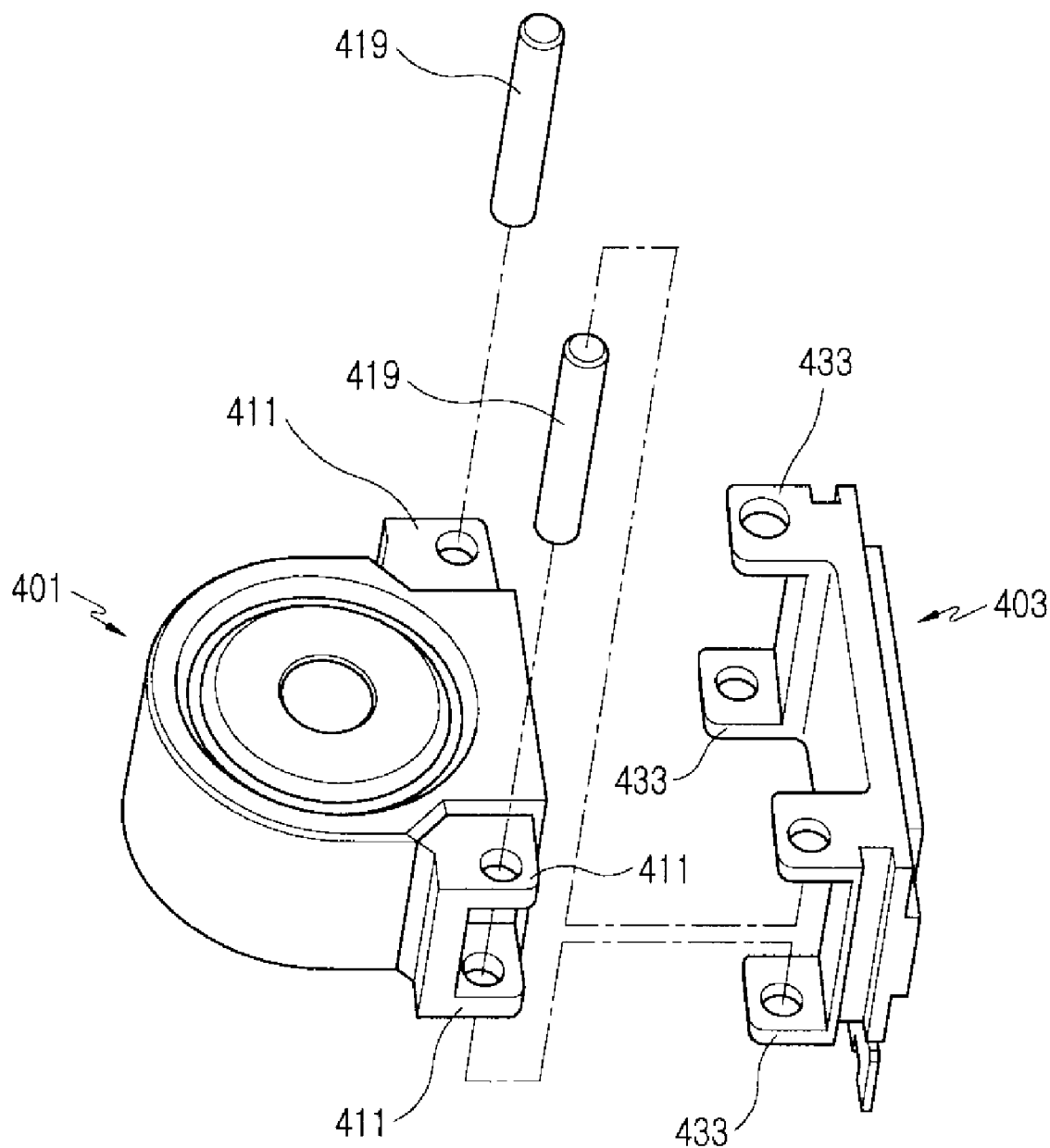
FIG. 10 is a perspective view of portions of the camera lens module illustrated in FIG. 9.
Figure 11:
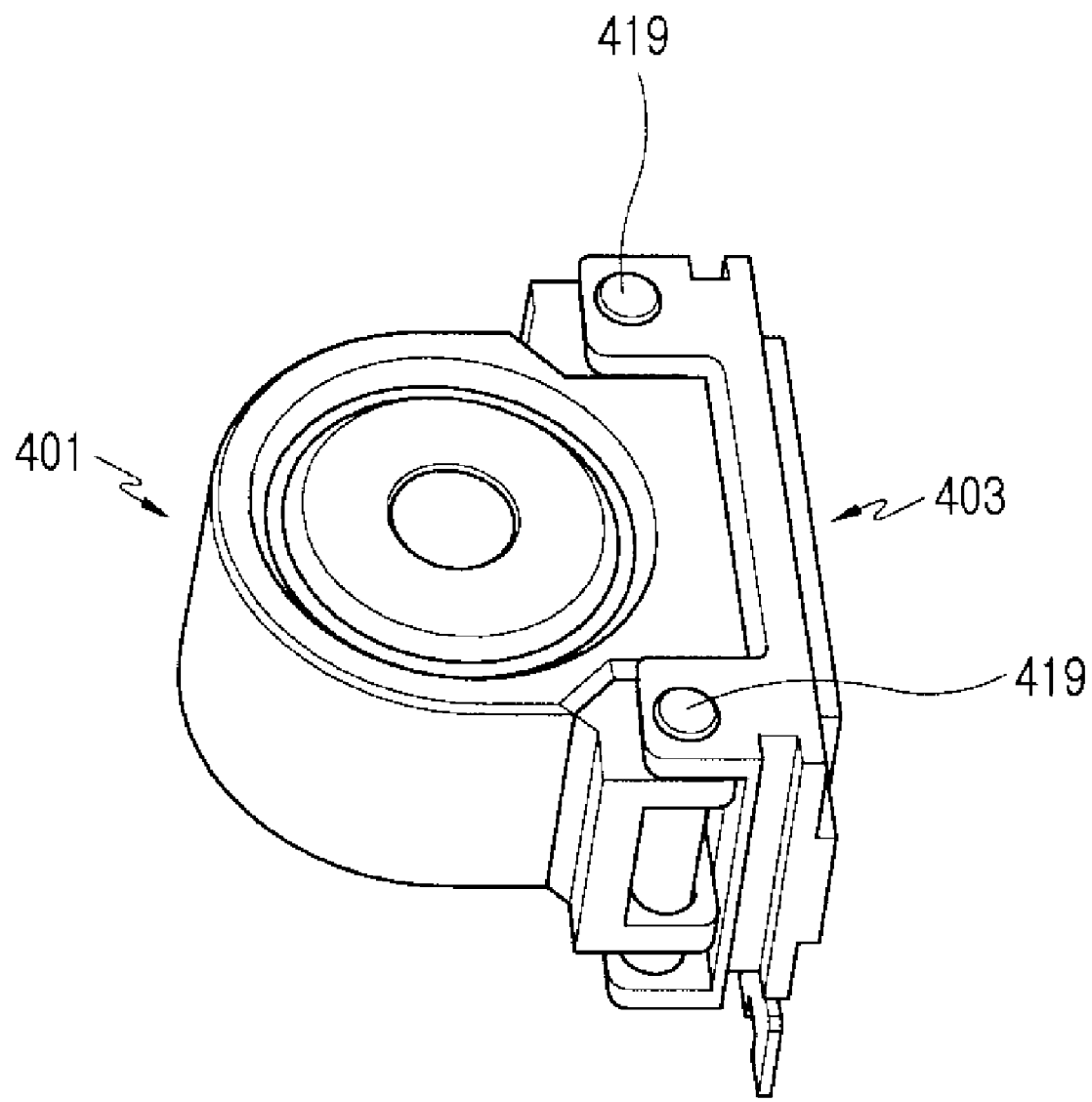
FIG. 11 is a perspective view of portions of the camera lens module illustrated in FIG. 10 in an assembled state.

With reference to FIGS. 9, 10 and 11, the configuration of a camera lens module according to a third exemplary embodiment of the present invention is now described. The same components as shown in the first and second exemplary embodiments of the present invention, or components that can be understood according to the first and second exemplary embodiments of the present invention are denoted by like reference numerals or by no reference numerals. Their detailed description may not be provided with regard to the disclosure of the third embodiment.

Referring to FIGS. 9, 10 and 11, the third exemplary embodiment of the present invention differs from the first and second exemplary embodiments of the present invention, in that a camera lens module 400 is provided with support members and guide rods to guide the linear movement of the lens housing with respect to the support portion. As described before, the camera lens module according to the first and second exemplary embodiments of the present invention has the guide grooves 111 and the guide protrusions 133 to guide the movement of the lens housing.

The camera lens module 400 is provided with first support members 433 formed in one of a lens housing 401 and a support portion 403, second support member 411 in the other of the lens housing 401 and the support portion 403, and guide rods 419. The guide rods 419 are slidably extended through the second support members 411 so that both their ends are fixed to the first support members 433.

In accordance with the third exemplary embodiment of the present invention, two pairs of first support members 433 are formed in the support portion 403, one pair facing the other pair along an optical axis direction. That is, one pair of guide rods 419 are provided.

Two pairs of second support members 411 are formed in the lens housing 401, one pair facing the other fair along the optical axis direction. When the lens housing 401 is engaged with the support portion 403, the second support members 411 are disposed between the first support members 433. As the distance between the facing first support members 411 is designed to be longer than that between the facing second support members 433, a range in which the lens housing 401 can move along the optical axis is restricted. That is, the movement range of the lens housing 401 is limited to a range in which the second support members 433 can move between the first support members 411.

As in the first and second exemplary embodiments of the present invention, the camera lens module 400 is provided with a control member and thus an initial focal length can be controlled according to the characteristics of lenses installed in the lens housing 401, which will not be described in detail herein.

The camera lens module 400 can further be provided with a second elastic member 449 between a cover 404 and the lens housing 401. The second elastic member 449 provides a force to move the lens housing 401 toward image sensor 121. With the actuator 106 inoperative, the lens housing 401 is kept closest to the image sensor 121 with the force of the elastic member 449 only.

In FIG. 9, as bottom second support members 411 are brought into contact with bottom first support members 433, the lens housing 401 cannot move toward the image sensor 121 any further. Even though the actuator 106 operates, when top second support members 411 contact top first support members 433, the lens housing 401 cannot recede from the image sensor 121 any further.

In the state where the lens housing 401 is closest to the image sensor 121, an initial focal length can be controlled by use of the control member. During photographing, the actuator 106 is operated by sensing the distance to an object through an additionally procured sensor and thus the lens housing 401 moves along the optical axis. Hence, an actual focal length is controlled. When the actuator 106 stops (i.e.

power is blocked from the electromagnet), the lens housing 401 moves closest to the image sensor 121 by the force of the second elastic member 449.

Referring to FIGS. 10 and 11, the camera lens module 400 is easily assembled as the lens housing 401 and the support portion 403 are fabricated in one module.

As is apparent from the above description, the camera lens module of the present invention is provided with a lens housing, a main frame, a support portion, a cover, and a control member. The lens housing is mounted in the main frame along the optical axis, in engagement with the support portion and the cover. The control member is rotatably combined with the cover. As the control member rotates on the cover and simultaneously moves the lens housing over the main frame along the optical axis together with the support portion, an initial focal length is easily adjusted. Also, the movement of the lens housing reduces generation of foreign materials, thereby preventing the decrease of the image quality of a captured image and the reliability of the camera lens module caused by the foreign materials. Furthermore, since the lens housing is combined with the main frame without using screw threads, the present invention contributes to miniaturization of camera lens modules.

Furthermore, the use of support members and guide rods to guide the movement of the lens housing for focal length control during photographing makes the movement of the lens housing stable and enables miniaturization of the camera lens module. Also, the camera lens module is easily assembled since the lens housing and the support portion that supports the lens housing are fabricated in a single mode by use of the support members and the guide rods.

While the invention has been shown and described with reference to certain exemplary embodiments of the present invention thereof, they are mere exemplary applications.

For example, while the second support members are formed in the lens housing and move between the first support members by support of the guide rods in the third exemplary embodiment of the present invention, it is obvious to those skilled in the art that the support members formed in the support portion can be configured so as to move between the support members formed in the lens housing by support of the guide rods.

Also, a coil spring is shown as the second elastic member in FIG. 9. Yet, the coil spring can be replaced by a plate spring and its position can be changed. While it has been described that when the actuator is inoperative, the elastic force of the second elastic member moves the lens housing toward the image sensor, the elastic force of the second elastic member can recede the lens housing from the image sensor depending on lenses installed in the lens housing.

Thus, it will be understood by those skilled in the art that various changes in form and details may be made therein without departing from the spirit and scope of the present invention as defined by the appended claims and their equivalents.

What is claimed is:

1. A camera lens module comprising:
   a lens housing having at least one lens;
   a main frame for containing the lens housing along an optical axis;
   a support portion engaged with the lens housing and the main frame to be movable along the optical axis;
   a cover engaged with the main frame, for retaining the lens housing within the main frame; and
   a control member engaged through the cover and with the support member for moving the support portion along the optical axis, wherein the control member is screw-engaged with a through hole in the cover and makes a linear movement together with the support portion along the optical axis over the main frame, simultaneously with rotating on the cover.

2. The camera lens module of claim 1, further comprising an elastic member installed on the main frame, for providing an elastic force to move the support portion toward the cover.

3. The camera lens module of claim 2, wherein the support portion has one end supported by the control member and the other end supported by the elastic member, whereby said support portion is kept stationary at a predetermined position in the main frame.

4. The camera lens module of claim 2, wherein the elastic member is selected from one of poron and a plate spring.

5. The camera lens module of claim 1, further comprising:
   assembly protrusions protruding from an inner surface of the main frame to face each other; and
   assembly grooves formed on both side surfaces of the support portion, in correspondence with the assembly protrusions,
   wherein the assembly protrusions combine the main frame with the support portion and guide movement of the support portion by being inserted into the assembly grooves.

6. The camera lens module of claim 1, wherein the cover includes an opening formed along the optical axis in a state where the cover is engaged with the main frame, and the through hole is formed near the opening, facing the support portion.

7. The camera lens module of claim 6, wherein the control member supports the support portion, while the control member is engaged with the cover, extending through the through hole.

8. The camera lens module of claim 6, wherein the control member rotatably extends through the through hole and is screw-engaged with the support portion.

9. The camera lens module of claim 8, wherein the control member moves the support portion linearly along the optical axis over the main frame in response to rotation of the cover.

10. The camera lens module of claim 1, further comprising:
    an image sensor installed on the main frame, facing the lens housing, wherein the control member controls a distance between the lens housing and the image sensor by moving the support portion together with the lens housing along the optical axis.

11. The camera lens module of claim 1, further comprising:
    an actuator included in the support portion, for receiving power from the main frame; and
    a magnetic body engaged with the lens housing, for generating a driving force through interaction with the actuator,
    wherein the lens housing moves along the optical axis by receiving the driving force generated through interaction between the actuator and the magnetic body, thereby controlling a focal length when an object is captured.

12. The camera lens module of claim 11, wherein the actuator is an eletromagnet and the magnetic body is a permanent magnet.

13. The camera lens module of claim 1, further comprising:
    first support members formed in one of the lens housing and the support portion;
    a guide rod having one end fixed to a first support member and the other end fixed to another first support member; and
    second support members formed in the other of the lens housing and the support portion, wherein the guide rod is extended through the second support members to be movable along an optical axis.

14. The camera lens module of claim 13, further comprising a second elastic member between the cover and the lens housing, for providing a force to move the lens housing along the optical axis with respect to the support portion.

15. The camera lens module of claim 14, further comprising an image sensor installed in the main frame to face the lens housing, wherein the second elastic member provides a force to move the lens housing toward the image sensor.

16. The camera lens module of claim 15, wherein a movement range of the lens housing with the support portion is restricted as the first support members and the second support members interact each other.

17. The camera lens module of claim 14, wherein the second elastic member is one of a coil spring and a plate spring.

* * * * *